United States Patent
Hong et al.

(10) Patent No.: US 8,598,253 B2
(45) Date of Patent: Dec. 3, 2013

(54) POLYPROPYLENE CARBONATE PAINT COMPOSITION

(75) Inventors: Seunggweon Hong, Daejeon (KR); Jaeyoung Park, Wonju-si (KR); Hyelim Kim, Busan (KR); Kwangjin Chung, Daejeon (KR); Myungahn Ok, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 26 days.

(21) Appl. No.: 13/325,774

(22) Filed: Dec. 14, 2011

(65) Prior Publication Data

US 2012/0157569 A1 Jun. 21, 2012

(30) Foreign Application Priority Data

Dec. 17, 2010 (KR) .................. 10-2010-0130136
Nov. 30, 2011 (KR) .................. 10-2011-0126885

(51) Int. Cl.
*C08J 9/32* (2006.01)

(52) U.S. Cl.
USPC ............ 523/218; 528/196; 528/158; 521/172

(58) Field of Classification Search
USPC .................. 528/196, 158; 521/172; 523/218
See application file for complete search history.

(56) References Cited

U.S. PATENT DOCUMENTS

| | | | |
|---|---|---|---|
| 6,713,599 B1 * | 3/2004 | Hinz et al. .................. | 528/408 |
| 6,991,874 B1 * | 1/2006 | Mohwald et al. ............. | 429/129 |
| 7,718,719 B2 * | 5/2010 | Esemplare .................. | 524/93 |
| 2004/0171721 A1 * | 9/2004 | Esemplare .................. | 524/100 |
| 2007/0093574 A1 * | 4/2007 | Esemplare .................. | 524/100 |
| 2011/0171465 A1 * | 7/2011 | Yasuda et al. ............. | 428/355 N |
| 2011/0230580 A1 * | 9/2011 | Allen et al. ................. | 521/172 |

FOREIGN PATENT DOCUMENTS

KR 20000042826 A 12/1998

* cited by examiner

*Primary Examiner* — James J Seidleck
*Assistant Examiner* — Peter A Salamon
(74) *Attorney, Agent, or Firm* — The Webb Law Firm

(57) ABSTRACT

Provided is a polypropylene carbonate (hereinafter, PPC) paint composition, and more particularly, a pre-coated metal (PCM) paint composition for coil coating, which is mainly applied to cases for home appliances requiring high hardness, such as cases of a refrigerator. The composition can be used to provide a PCM paint, which has very low smoke density at the time of burning and emits remarkably low amounts of combustion gas and poisonous gas due to combustion at the time of firing, as compared with the existing laminate steel plate and a high-gloss film. In addition, the composition exhibits excellent adhesion to metal materials and excellent durability so that it can be usefully used for a PCM print steel plate applied to home appliances.

5 Claims, No Drawings

POLYPROPYLENE CARBONATE PAINT COMPOSITION

CROSS-REFERENCE TO RELATED APPLICATIONS

This application claims priority under 35 U.S.C. §119 to Korean Patent Application No. 10-2010-0130136, filed on Dec. 17, 2010, and No. 10-2011-0126885, filed on Nov. 30, 2011 in the Korean Intellectual Property Office, the disclosures of which are incorporated herein by reference in their entirety.

TECHNICAL FIELD

The following disclosure relates to a polypropylene carbonate (hereinafter, PPC) paint composition. More particularly, the following disclosure relates to a paint composition for a pre-coated metal (hereinafter, PCM) print steel plate mainly used in cases for home appliances requiring high hardness, including a refrigerator. The following disclosure provides a PPC paint composition applicable to a PCM print steel plate used for home appliances or the like, capable of allowing combustion gas to be very little generated at the time of firing and enhancing adhesion to materials and durability thereof, as compared with a laminate steel plate and a high-gloss film, by using a cross-linked PPC resin.

BACKGROUND

A steel plate for a home appliance of the related art was manufactured by post-processing a PCM steel plate or performing powder coating on a PCM steel plate after processing the PCM steel plate. However, because of the trend toward classy home appliances and the improvement in living standards of consumers, color differentiation by ink printing and diversity of gloss is pursued instead of the existing single color tone of PCM and a powder coated panel, and thus, a PCM laminating coating manner for meeting the needs has been widely used.

As such, a laminate attached to an iron plate by the PCM coating method allows excellent gloss and does not require separate ink printing, as compared with a paint coating system. However, since the laminate is attached by using only an adhesive, the laminate has poor adhesion to materials as compared with a case of using the paint, and home appliances may be problematic in main physical properties. For example, durability such as corrosion resistance, water resistance, or the like, may be degraded in the home appliances. Also, a laminate film has a thickness of 150 to 160 μm, and this is thicker than a coating thickness of the paint, 25 to 35 μm, resulting in a high price per area, which gives rise to an extreme price rise burden for classy home appliances. Also, since the laminate film itself is printed with ink, it is difficult for coating companies and electronic companies to manage designs on their own. Above all things, the cause of human deaths in a recent big fire lies in poisonous gas and a large amount of smoke, which are generated at the time when surrounding furniture and home appliances are burning, and these make it fail to find escape ways, resulting in extensive damage.

Among the above problems, in order to meet the needs for classy products by customers, there is an attempt of a coating by a 4-coating-3-baking system, of which coating of a transparent paint is performed in a wet-on-wet manner by installing ink-printable facilities in a coating line. An ink printing system allows coating on a thin film, as compared with a laminated film, improves coating physical properties by a system of bottom coat paint-base paint-ink-transparent paint, and ensures economic feasibility. Korean Patent Laid-open Publication No. 1998-059115 (Patent Document 1) discloses a polyester paint composition prepared by employing a coating method using a 4-coating 3-baking system.

However, the existing resins can not attain a low smoke density at the time of firing, and measures for ensuring adhesion and durability of the paint cannot be developed.

PATENT DOCUMENT (Patent Document 1) Korean Patent Laid-Open Publication No. 1998-059115

SUMMARY

The present invention was completed by using a PPC resin, which is prepared by a reaction of carbon dioxide and propylene oxide, having little smoke and remarkably low probability of generating poisonous gas at the time of burning. Further, the present invention can enhance the hardness thereof itself, strengthen adhesion to metals, and improve durability thereof, by employing the PPC resin and also cross-linking the PPC resin at high density. Further, the present invention can have an equal or higher level of coating performance as compared with the existing polyester PCM paint, and also reduce the coating thickness, thereby allowing more superior economic feasibility than the existing laminating method.

Therefore, an object of the present invention is to provide a paint composition which is safe at the time of firing due to low smoke density during combustion and has excellent coating performance, by cross-linking PPC.

In one general aspect, a paint composition of the present invention includes a polypropylene carbonate resin and a cross-linking agent.

Here, the polypropylene carbonate resin may have a weight average molecular weight of 50,000 to 150,000 g/mole, and may contain hydroxy groups at both ends of a molecular chain.

The cross-linking agent may be a polyamine-based compound or a polyisocyanate-based compound.

The paint composition may further include a pigment, a first functional additive, a second functional additive, or a mixture thereof.

Here, the first functional additive may be at least one component selected from white clay or fumed silica, and the second functional additive may be at least one selected from acryl-based polymers, vinyl-based polymers, and silicon-based compounds.

Further, the paint composition may further include a hardening catalyst.

The hardening catalyst may be at least one selected from dodecylbenzenesulfonic acid, dibutyltin dilaurate, p-toluene sulfonic acid, dinonyl dinaphthalene sulfonic acid, and dinaphthalene disulfonic acid.

One aspect of the present invention is to provide a paint composition including a PPC resin having a weight average molecular weight of 50,000 to 150,000 g/mole, a cross-linking agent, a first functional additive, a second functional additive, and a solvent.

Another aspect of the present invention is to provide a paint composition including a PPC resin having a weight average molecular weight of 50,000 to 150,000 g/mole, a cross-linking agent, a first functional additive, a second functional additive, a hardening catalyst, a pigment, other additives, and fumed silica.

Hereinafter, the present invention will be described in more detail.

As to a PPC resin, which is a main component of the present invention, a weight average molecular weight thereof is 50,000 to 150,000 g/mole, one or more hydroxy groups are provided at both ends of a molecular chain thereof, and a glass transition temperature thereof is 30 to 40° C.

The PPC resin used in the present invention was synthesized by a reaction of carbon dioxide and propylene oxide. Preferably, in the synthesized polypropylene carbonate, carbonates of carbon dioxide and propylene oxides are alternately linked, and ether bonds of propylene oxide are contained in 3 mol % or lower, which is determined by NMR analysis. Also, the polypropylene carbonate has a weight average molecular weight of 50,000 to 150,000 g/mole.

GreenPol by SK ENERGY Company may be an example of the resin. If the molecular weight of the PPC resin is higher than 150,000 g/mole, solubility thereof to the solvent becomes lowered, with the result that the resin content does not exceed 20 wt %, thus failing to serve as a role of vehicle. If the molecular weight of the PPC resin is lower than 50,000 g/mole, coating strength becomes weakened and scratch resistance and solvent resistance (durability to MEK Rubbing) are lowered.

The glass transition temperature of the resin is preferably between 30° C. and 40° C. If this value is too high, coating processability becomes deteriorated, and if this value is lower than the above range, coating hardness becomes weakened.

The PPC resin may be preferably contained in 25 to 65 wt % of the whole paint composition. If the content of the PPC resin is below 25 wt %, control of the coating thickness is difficult at the time of coating, and thus, coating feeling becomes deteriorated due to thin film coating, and adhesion to the pigment becomes reduced in a case where the pigment is present. If the content of the PPC resin is above 65 wt %, control of viscosity control needed in coating work is difficult, and thus deterioration of leveling, defoaming, anti-popping, or the like may occur at the time of coating.

The PPC paint composition is characterized by further including a cross-linking agent cross-linkable with the PPC resin.

Any cross-linking agent that can be used in the art is not limited as long as it is cross-linkable with the PPC resin. Examples thereof may include polyamines, polyisocyanates, and the like, but are not limited thereto. More specifically, melamine or the like may be examples of the polyamines, and diisocyanate-based compounds such as hexamethylene diisocyanate (HDI) trimer, MDI, TDI, or the like may be examples of the polyisocyanates.

Examples of the melamine may include butoxy melamine and methoxy melamine, and the methoxy melamine is more appropriate due to high hardening rate thereof. Examples of the butoxy melamine may include a butylated melamine formaldehyde resin and the like.

Also, examples of the polyisocyanate may include HDI trimer or TDI or MDI, which is aromatic diisocyanate. However, in a case of the diisocyanate, a yellowing phenomenon may occur at the time of high-temperature bake hardening.

The use amount of this cross-linking agent may be variously controlled depending on the kind thereof, and for example, a PPC paint is used in a content of 0.1 to 30 wt % of the whole PPC paint composition. For specific example, the butylated melamine formaldehyde resin may be used in a content of 2 to 20 wt %, and hexamethylene diisocyanate trimer may be used in a content of 0.5 to 5 wt %.

When the PPC resin is cross-linked by using melamine or diisocyanate, high hardness and an increased molecular weight thereof are obtained, resulting in strengthening coating mechanical hardness and enhancing solvent resistance (durability to MEK Rubbing) for determining durability thereof.

Examples of the solvent according to the composition of the present invention may include solvents for dissolving PPC therein, or a mixture thereof. However, the solvent of the present invention is not particularly limited as long as it does not dissolve ink resin used for a base in a wet-on-wet system. Examples thereof may include ketone, ether, ester, alcohol, and the like. For specific example, propylene glycol monomethyl ether acetate (PMA), methyl ethyl ketone (MEK), or the like may be used. Here, they may be used through appropriate control of the contents thereof, and for example, mixed at a volume ratio of 1:1 or the like. For specific example, PMA and MEK are mixed and used at a volume ratio of 1:1, and preferably they may be used in a range of 0.5 to 70 wt %.

The hardening catalyst also may be used in the present invention. In a case where diisocyanate and melamine are used as the cross-linking agent, any one of dodecylbenzenesulfonic acid, dibutyltin dilaurate (DBTDL), p-toluene sulfonic acid, dinonyl dinaphthalene sulfonic acid, and dinaphthalene disulfonic acid may be used as the hardening catalyst. The hardening catalyst may be used in a content of 0.01 to 0.5 wt % of the complete PPC paint composition.

According to the present invention, a colored composition can be prepared by adding a pigment. The pigment may be used in a range of 0.1 to 30 wt % of the complete PPC paint composition. Examples of the pigment may include titanium dioxide, and cyan blue, magenta, and yellow pigments, and a mixture thereof.

In addition, the present invention may further include a first functional additive for stabilizing the pigment or other additives. The first function additive is not particularly limited as long as it can stabilize the pigment to allow excellent dispersion. Examples thereof may include white clay such as Organo-Clay or the like or fumed silica. The content thereof may be used in 0.01 to 5 wt %, preferably 0.01 to 2 wt %, which induces non-glossy effect or the like while other physical properties are maintained. The other additives may be a dispersing agent, a leveling agent, a color feeling enhancer, an anti-sinking agent, an anti-sagging agent, and the like, and contents thereof each are 0.01 to 5 wt %.

The resin of the present invention may further include the second function additive in order to improve the leveling property and defoaming property. Any material that can be normally known in the art may be used, and for example, an acryl-based, a vinyl-based, or a silicon-based additive may be preferably used in a content of 0.01 to 1 wt %. Examples of the additive may be 143, 356, 410, 2163, 2105 of BYK Company. Any additive may be used without limitation, as long as it can achieve objects of the present invention. However, since separation of the additive may occur, an appropriate amount of the additive needs to be used. In particular, when an acryl modified polyester resin is added to the composition of the present invention, gloss and film formability as well as leveling property and defoaming property thereof are distinctive and excellent.

If dissolving power of the solvent is insufficient, leveling property of the paint is difficult to ensure, resulting in deteriorating coating gloss. A PMA-MEK solvent system corresponding to an example of the present invention has sufficient solvency to the PPC resin, and thus, the leveling property of the paint is excellent and dispersion of inorganic pigment particles is stable. In order to improve stability of this pigment, it is preferable to use white clay or fumed silica in a content of 0.001 to 5 wt %, and any type among them may be used.

It is preferable to perform bake hardening on the above-described paint at a temperature of 180° C. to 280° C. for 30 seconds. The thus obtained paint composition of the present invention can achieve the objects of the present invention.

DETAILED DESCRIPTION OF EMBODIMENTS

Hereinafter, the present invention will be described in more detail with reference to the following Examples, but the scope of the present invention is not limited thereto.

Example 1

100 g (25.71 wt %) of PPC (GreenPol product, SK ENERGY Company) containing a hydroxy group at one end of a molecule chain thereof, and having a weight average molecular weight of 100,000 g/mole and a glass transition temperature of 35° C. was put into a metal can, and 200 g of solvent in which PMA and MEK were mixed at a volume ratio of 1:1 was further added thereto, followed by sufficient stirring.

0.3 g (0.08 wt %) of Organo-Clay (Bentone) was slowly put into the stirred solution while stirring. Then, after glass beads with a diameter of 2 to 3 mm were put thereinto, sufficient dispersing was performed for 2 hours using a shake type disperser such that dispersion was conducted at a level of 5 μm or less at the time of measurement by grind gage. Again, 68 g (17.48 wt %) of the PPC resin, 10.0 g (2.57 wt %) of butylated melamine formaldehyde, and 9.5 g (2.44 wt %) of a mixed solvent of PMA and MEK at a volume ratio of 1:1 were put into the solution, followed by sufficient stirring.

For dispersing stability, 0.05 g of BYK-143 and 0.1 g of BYK-410 (total amount of additives: 0.04 wt %) as the additives were put thereinto, followed by stirring. Finally, 1 g (0.26 wt %) of p-toluene sulfonic acid as a hardening catalyst was slowly put thereinto, thereby preparing a PPC paint composition.

The paint composition was diluted with methylethyl ketone before coating, such that it has coating viscosity (in Ford Cup No. 4, 25, for 80 seconds).

On 0.4 T of an EGI steel plate coated with an epoxy type paint for a bottom coat in a dry coating thickness of 5 μm, the diluted PPC paint composition was coated to form a top coat of 20 μm by using a bar coat. Then, bake hardening was performed at 250° C. for 30 seconds to prepare a specimen for physical property tests.

The test results with respect to physical properties of the coating film were tabulated in Table 1.

Example 2

The same procedure as Example 1 was conducted except that 3 g of HDI trimer was inputted instead of melamine and 0.1 g of dibutyltin dilaurate (DBTDL) was inputted instead of p-toluene sulfonic acid.

Example 3

The same procedure as Example 1 was conducted except that PPC having a molecular weight of 50,000 g/mole was used.

Example 4

The same procedure as Example 1 was conducted except that 0.1 g of fumed silica was further included.

Example 5

168 g (43.24 wt %) of PPC (GreenPol product, SK ENERGY company) containing a hydroxy group at one end of a molecule chain thereof, and having a weight average molecular weight of 100,000 g/mole and a glass transition temperature of 35° C. was put into a metal can, followed by addition of 210 g (54.06 wt %) of solvent in which PMA and MEK were mixed at a volume ratio of 1:1 and addition of 0.5 g (0.13 wt %) of dodecylbenzene sulfonic acid as a catalyst, and then the resulting mixture was sufficiently stirred. Again 10.0 g (2.57 wt %) of butylated melamine formaldehyde resin was put into the solution, followed by sufficient stirring. Then the resulting material was coated on Teflon, and then hardened at 300° C. for 3 minutes.

Example 6

168 g (43.40 wt %) of PPC (GreenPol product, SK ENERGY Company) containing a hydroxy group at one end of a molecule chain thereof, and having a weight average molecular weight of 100,000 g/mole and a glass transition temperature of 35° C. was put into a metal can, followed by further addition of 210 g (54.12 wt %) of solvent in which PMA and MEK were mixed at a volume ratio of 1:1, and then the resulting mixture was sufficiently stirred. Again 10.0 g (2.58 wt %) of butylated melamine formaldehyde resin was put into the solution, followed by sufficient stirring. Then the resulting material was coated on Teflon, and then hardened at 300° C. for 3 minutes.

Comparative Example 1

The same procedure as Example 1 was conducted except that PPC having a molecular weight of 200,000 was used.

Comparative Example 2

In order to compare Examples of the present invention with a steel plate coated with a laminated film in view of coating physical properties, a steel plate on a front surface of a refrigerator accessible on the market was separated, and then physical properties thereof were tested. The results were tabulated in Table 1.

TABLE 1

|  | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|
| External appearance | Good | Good | Good | Good | Good | Good | Rough surface | Good |
| Gloss | 105 | 101 | 104 | 109 | 105 | 103 | 95 | 107 |
| Pencil hardness | 4H | 4H | 4H | 5H | 4H | 3H | 4H | 4H |
| Impact (Crack, Delaimation) | Good | Good | Good | Good | Good | Good | Crack | Good |
| CCE adhesioin (number of delaminated specimens in 100 specimens) | 0 | 0 | 0 | 0 | 0 | 0 | 35 | 0 |

TABLE 1-continued

|  | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|
| T-Bend Processibility (Crack, Delamiantion) | Good | Good | Good | Good | Good | Good | Crack | Good |
| MEK Rubbing | 60 times | 63 times | 67 times | 68 times | 63 times | 60 times | 56 times | 57 times |
| Layer Separation | Not shown | Not shown | Not shown | Not shown | Not shown | Not shown | Not shown | — |
| Smoke Density [Dm(corr)] (ASTM E662) | 4.3 | 5.1 | 4.7 | 4.1 | 2.5 | 2.1 | 5.3 | 853 |

As seen in Table 1, Comparative Example 1 showed deteriorated processability and adhesion. However, the paint of the present invention allows coating of a film thinner than a laminate of the related art, and thus, providing excellent economic feasibility and adhesion to materials. Also, the coating film obtained by the present invention is equal to or superior to the commercialized laminate product of Comparative Example 2 in view of hardness, gloss, and the like. Whereas, the burning test can show that the coating film of the present invention is an excellent product, which has a remarkably lower smoke density than the laminate of the related or other polymer materials, resulting in little smoke. Further, addition of fumed silica can enhance coating strength and ensure low smoke density, thereby securing both performance and safety as a paint for home appliances.

The paint composition according to the present invention can enhance the hardness thereof itself, strengthen adhesion to metals, and improve durability thereof, by cross-linking the PPC resin at high density. Further, the present invention has an equal or higher level of coating performance as compared with the existing polyester PCM paint, and also reduces the coating thickness, thereby allowing more superior economic feasibility than the existing laminating method.

What is claimed is:

1. A paint composition, comprising a polypropylene carbonate resin as a main component, a cross-linking agent, and a hardening catalyst, wherein the polypropylene carbonate resin has a weight average molecular weight of 50,000 to 150,000 g/mole and including hydroxy groups at both ends of a molecular chain thereof, and the hardening catalyst is at least one selected from dodecylbenzenesulfonic acid, p-toluene sulfonic acid, dinonyl dinaphthalene sulfonic acid, and dinaphthalene disulfonic acid.

2. The paint composition of claim 1, wherein the cross-linking agent is selected from the group consisting of polyamine-based compounds and polyisocyanate-based compounds.

3. The paint composition of claim 2, further comprising a pigment, a first functional additive, a second functional additive, or a mixture thereof.

4. The paint composition of claim 3, wherein the first functional additive is at least one selected from white clay or fumed silica, and the second functional additive is at least one selected from acryl-based polymers, vinyl-based polymers, and silicon-based compounds.

5. The paint composition of claim 1, further comprising an acryl modified polyester resin.

* * * * *